US011237852B1

(12) United States Patent
Schutzman et al.

(10) Patent No.: US 11,237,852 B1
(45) Date of Patent: *Feb. 1, 2022

(54) AUTOMATED GRAPHICAL USER INTERFACE GENERATION FOR GOAL SEEKING

(71) Applicant: Wells Fargo Bank, N.A., San Francisco, CA (US)

(72) Inventors: Erik Schutzman, Fort Mill, SC (US); Tambra Nichols, Charlotte, NC (US); Susan Bell McCraw, Mooresboro, NC (US); H. Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,643

(22) Filed: Jul. 31, 2020

Related U.S. Application Data (63) Continuation of application No. 15/994,320, filed on May 31, 2018, now Pat. No. 10,768,949.

(51) Int. Cl.
*G06F 9/451* (2018.01)
*G09B 19/00* (2006.01)
*G06F 3/048* (2013.01)
*G06F 3/0484* (2013.01)

(52) U.S. Cl.
CPC ............. *G06F 9/451* (2018.02); *G09B 19/00* (2013.01); *G06F 3/04842* (2013.01)

(58) Field of Classification Search
CPC ...... G06F 9/451; G06F 3/04842; G09B 19/00
See application file for complete search history.

(56) References Cited

U.S. PATENT DOCUMENTS

| | | | |
|---|---|---|---|
| 6,729,884 B1 | 5/2004 | Kelton et al. | |
| 7,685,034 B1* | 3/2010 | Mori | G06Q 40/06 705/31 |
| 8,412,608 B2 | 4/2013 | Gonen | |
| 8,512,042 B2 | 8/2013 | Rogan et al. | |
| 9,207,830 B2* | 12/2015 | Papa | G06F 3/04845 |
| 10,768,949 B2 | 9/2020 | Schutzman et al. | |
| 2009/0298019 A1 | 12/2009 | Rogan et al. | |
| 2010/0193508 A1 | 8/2010 | Tang | |

(Continued)

OTHER PUBLICATIONS

Steven M. LaValle, Planning Algorithms, 2006, Cambridge University Press, pp. 1-36 (Year: 2006).*

(Continued)

*Primary Examiner* — Hugo Molina
(74) *Attorney, Agent, or Firm* — Schwegman Lundberg & Woessner, P.A.

(57) ABSTRACT

Profile information describing an attribute of a user is received from a network-based service. A selection of a goal relating to the attribute is received from the user. A start point of the user is determined with respect to the goal, where the start point is based on the profile information. A path is determined from the start point to the goal. A map on which the path is visually represented is generated and displayed. The progress of the user is tracked, including representing the user as being at a point on the path. A graphical depiction of a displayed incline of the path is changed based on the tracking of the progress of the user.

20 Claims, 5 Drawing Sheets

(56) References Cited

U.S. PATENT DOCUMENTS

| | | |
|---|---|---|
| 2010/0248192 A1 | 9/2010 | Thompson et al. |
| 2011/0223570 A1 | 9/2011 | Bellontine |
| 2011/0288763 A1* | 11/2011 | Hui .................. G08G 1/096861 |
| | | 701/533 |
| 2012/0226623 A1 | 9/2012 | Jurney et al. |
| 2013/0097060 A1 | 4/2013 | Taylor |
| 2014/0052659 A1 | 2/2014 | Karandikar et al. |
| 2014/0278929 A1 | 9/2014 | Bhatia et al. |
| 2015/0170115 A1 | 6/2015 | Lacek |
| 2015/0332149 A1 | 11/2015 | Kolb et al. |
| 2016/0346612 A1 | 12/2016 | Rowley |
| 2016/0379507 A1* | 12/2016 | Reale ..................... G09B 5/125 |
| | | 434/238 |
| 2017/0330155 A1 | 11/2017 | Rana |
| 2018/0051991 A1* | 2/2018 | Hong ................... G01C 21/343 |
| 2019/0370026 A1 | 12/2019 | Schutzman et al. |

OTHER PUBLICATIONS

U.S. Appl. No. 15/994,320, filed May 31, 2018, Automated Graphical User Interface Generation for Goal Seeking.

"U.S. Appl. No. 15/994,320, Final Office Action dated Feb. 24, 2020", 23 pgs.

"U.S. Appl. No. 15/994,320, Non Final Office Action dated Aug. 29, 2019", 17 pgs.

"U.S. Appl. No. 15/994,320, Notice of Allowance dated May 6, 2020", 10 pgs.

"U.S. Appl. No. 15/994,320, Response filed Apr. 10, 2020 to Final Office Action dated Feb. 24, 2020", 11 pgs.

"U.S. Appl. No. 15/994,320, Response filed Nov. 25, 2019 to Non Final Office Action dated Aug. 29, 2019", 12 pgs.

Steven, Lavalle M, "Planning Algorithms", Cambridge University Press, (2006), 1-36.

* cited by examiner

AUTOMATED GRAPHICAL USER INTERFACE GENERATION FOR GOAL SEEKING

CROSS-REFERENCE TO RELATED APPLICATIONS

This application is a continuation of U.S. patent application Ser. No. 15/994,320, filed May 31, 2018 and entitled "Automated Graphical User Interface Generation for Goal Seeking," the entirety of which is hereby incorporated herein by reference.

BACKGROUND

Computing devices may provide one or more Graphical User Interfaces (GUI)s by rendering the GUI to a framebuffer that is output to a display device. The computing devices may receive input from input devices such as a keyboard (either physical or onscreen), a mouse, a stylus, or the like which may be utilized to interact with these GUIs. The layouts of these GUIs are typically static in that they are not otherwise customized to the user based upon their goals.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Prior art GUIs are not adaptive to a user's needs in accomplishing a goal. For example, despite a user's current context, present GUIs remain static and do not provide feedback to the user. For example, in the context of a user seeking to accomplish a goal, the GUIs are typically limited to basic fields and text. Moreover, the particular path a user utilizes to accomplish a particular goal are limited to paths based upon simple mathematical relationships. These GUIs are not intuitive, nor are they easy to use and are not responsive to a user's needs.

Disclosed in some examples are systems, methods, and machine-readable mediums that provide for customized goal seeking GUIs that are created by one or more algorithms based upon user input and user profile information from either a GUI service or another network accessible service. In some examples, the GUI may be provided via one or more GUI descriptors that are created by the GUI service and sent to a computing device of the user. The computing device of the user may then render the GUI descriptors to create a GUI for the user that is customized to the user and their progress towards one or more goals. Example GUI descriptors include data used to render a GUI, such as for example, one or more of HyperText Markup Language (HTML) documents, scripting documents (such as JavaScript), eXtensible markup language (XML), Cascading Style Sheets (CSS), and the like.

These GUI descriptors may be rendered in a specialty application (e.g., a goal service application), or in a general application such as a web browser. As one example, a user may enter one or more goals, constraints on those goals (e.g., a timeframe), preferences, and other inputs. In some examples, the user may be given one or more options (e.g., get a job, save an allowance, sell property). Based upon these inputs the system may create customized GUI descriptors that, when rendered, illustrate a map with a path from the current state to the goal state of the user. The map may have one or more steps that have associated progress targets that represent intermediate steps from the start to the goal state. The map may have one or more milestones. Milestones are steps that are designated as important. For example, if the user is on progress to make the goal at a milestone, a first route may be taken. If the user is not on progress to make the goal at a particular milestone, a second route (which may be more difficult) may be taken.

During an initial setup, the system may ask the user for one or more goals. The goals may be related to an attribute of the user described in profile information of the GUI service or a network accessible service. For example, the network accessible service may be a social networking service and the goals may relate to acquiring more followers. In other examples, the network accessible service may be a health service that tracks a user's exercise levels and the goal may be a health-related goal. In other examples, the network service may be a financial service (such as a bank) and the goals may be financial in nature. In some examples, goals may be educational goals (such as financial education). In some examples, one or more options may be identified for achieving the goal. For example, for financial goals, income sources may be presented as various options for the user. The user may select one or more of these options. The system may determine one or more paths to achieve that goal based upon the options chosen and utilize the paths to determine a GUI map to traverse a journey from a current state of the user to a desired goal state. The map may comprise a graphical representation of the path from the current state to the desired goal state.

In some examples, the GUI service may monitor a status of the user in achieving the desired goal. For example, the GUI service may contact a network accessible service for user profile information (e.g., an account balance, investment goals, exercise events, follower data, and the like). Other data sources may include computing device sensor data (e.g., wearables, mobile phones, and the like); mobile wallet application data (e.g., for tracking purchases, balances, etc.); and the like. In response to this data, an avatar representing the user on the journey between the start and the goal may be moved or updated along the path. In some examples, if the user is ahead of or behind their goal, the map and/or the steps may be adjusted to reflect the user's progress. Various steps may have rewards. Thus, if a user has met the progress corresponding to a particular step, the user may be rewarded. Rewards may include monetary transfers, digital rewards (avatars, certificates, the chance to play one or more games), and the like. In some examples, steps may have educational components. That is, the user may have to receive a particular grade in an accredited school, take an online course, pass an online test, or the like. This ensures that the user is able to learn about a particular topic as they complete their journey.

One example application of this system may be a financial goal-seeking application for a child that assists the child in reaching financial goals that either they, or their guardian select. The child and/or guardian may select a financial goal that they wish to achieve and a means of achieving the goal (e.g., a job, saving allowance, gifts, selling property, and the like). Example goals may or may not have constraints such as a time constraint that specifies when the user wishes to achieve the goal. Other constraints may be imposed—e.g., for purchasing goals, the child must save a certain percentage of their money in savings for college or some other purpose. Financial goals may include one or more of:

purchasing goals such as: buying tickets to an event, buying a toy or game by a certain date; savings or investment quantity goals such as: investing or saving a certain amount;

investment quality goals—such as achieving a desired rate of return (e.g., students pick investments and attempt to achieve a specified rate of return); and the like.

A starting point may be determined, such as current account balances, expected income sources, and the like. The starting point may be determined by asking the user and/or may be automatically determined based upon past deposits into a financial account of the user. This may be utilized by the system to determine a path from the current starting point to the goal using a pathfinding algorithm. The map may have one or more steps represented as positions on the map. One or more steps may be termed milestones. Steps and/or milestones may be represented on the map by a number of graphical icons, such as points, obstacles, mile (or distance) markers, and the like. Milestones may be represented by a different graphical icon than steps to emphasize the importance of the milestone. Each step may be associated with a desired progress of the user to achieving the goal and may have an associated time (e.g., at the half-way point, the user should be halfway from the start to the goal).

Upon achieving a milestone or achieving the ultimate goal, the system may reward the user, such as by playing an animation, a sound, or other audio-visual element (e.g., by giving a user a "badge," allowing the user to upgrade an avatar with additional customizations, or the like). A parent or other supervisor may provide or insert one or more rewards for achieving milestones—such as a transfer of money from their savings, checking, or other accounts to their child's account. In some examples, achieving a milestone takes a first path and not achieving a milestone places the user on an alternative path that attempts to get the user back on track for reaching their goal. In some examples, the alternative path has different steps with different progress for each step. For example, in the case of a savings goal, the alternative path may have additional weekly savings per pay period to make up for the missed savings. In other examples, alternative paths may have modified goals. For example, goals that reflect the actual participation rate of the user.

The GUI may be themed, such that a child plays a character through a digital avatar and the goal is a game goal, such as rescuing another character, defeating a bad guy, or the like. Poor financial choices that put the goal in risk may have negative consequences on the character—such as decreasing an amount of life points the user has available. In some examples, computer game play may be part of the map. For example, in addition to financial savings, investments, etc., progress may also include completing elements of the game. The map may be themed similarly to the game. For example, a medieval map may be complemented by a medieval combat game. In some examples, various levels, sequences, or portions of the game may be unlocked by reaching milestones.

Figure 1:
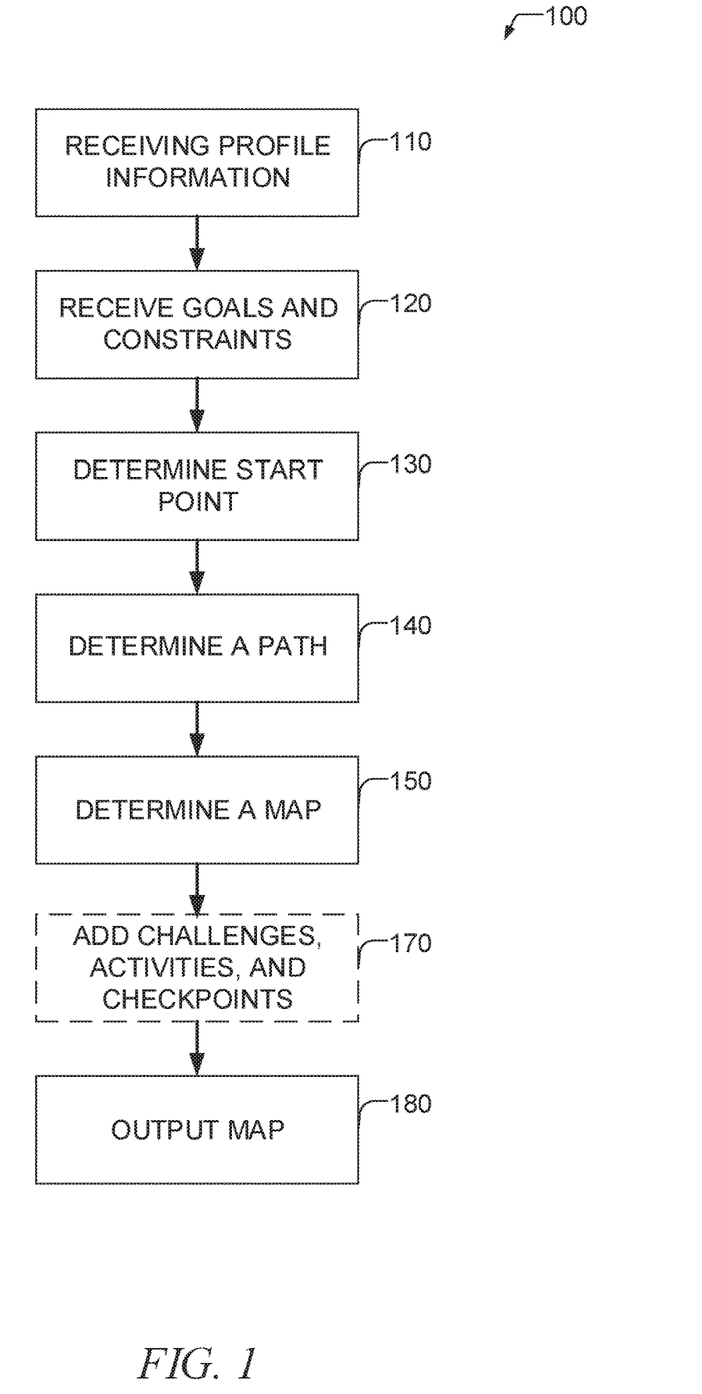
FIG. 1 illustrates a flowchart of a method of creating a goal seeking GUI according to some examples of the present disclosure.

FIG. 1 illustrates a flowchart of a method 100 of creating a goal seeking GUI according to some examples of the present disclosure. At operation 110 the system may receive profile information of the user. The profile information may describe one or more attributes of a user. For example, for a financial goal the system may receive bank account information such as savings account balances, checking account balances, investment account information, investment strategy information, mortgage account information, deposit information (to determine income) and the like. For fitness goals, the system may determine the user's age, exercise habits, and the like. For social media-based goals, the system may determine the number of followers the user has, the platforms they are associated with, and the like. This information may be retrieved by the system by contacting one or more external network accessible services. In other examples, this information may be entered manually by the user.

At operation 120 the system may receive one or more goals from the user. The goal may be related to the one or more attributes of the user, for example, information on their account on the network based service. As noted above, goals may include purchasing goals, savings or investment quantity goals, savings or investment quality goals, and the like. In some examples, the system may also receive one or more constraints from the user. Constraints may include limits or sub-goals that must be met for successfully achieving the main goal. For example, for a purchasing goal, a constraint may be that the user must save a certain percentage or amount of their income for college. In some examples, the system may also receive option selections—e.g., such as options for achieving the goal such as a choice of exercises (for exercise goals), a choice of income sources (for financial goals), a choice of content posts (for social media goals).

At operation 130, the system may determine a starting point. For example, a starting account balance, a starting rate of investment return, and the like for financial goals. For health and fitness goals, a starting point may include a current health of the user (e.g., as measured by one or more biometric devices), a current amount of exercise the user does, and the like. For goals related to social media, this may include a current number of followers. This may be based upon the account information, options, and constraints retrieved at operation 110. In other examples, this may be based upon a user input.

At operation 140, the system may determine a path based upon the starting point determined at operation 130 and the goals and constraints determined at operation 120. The path may be a series of steps along a time between a current time and a goal completion time and an expected progress at those points. For example, if the user currently has $0.00 saved and the goal is to save $500.00 in two years, then a linear function may be defined where y is the savings amount and x is time. The function may be a line through the initial point (0,0) and the goal point (54,500) (where x is divided up into each bi-weekly pay period and assuming 27 pay periods a year). The path (generally) may be defined as:

$$y=mx+b$$

In this particular example:

$$y = \frac{500}{54}x = 9.26x$$

Thus, given the above formula, at the halfway point (27$^{th}$ pay period), the user should have saved $250.00. Other, more complicated formula may be utilized to determine a user's progress. For example, formulas that account for a user's income, savings rate, compounded interest, investment predictions, and the like. The particular number of steps (e.g., every bi-weekly pay period) may be customized and set by the user.

In some examples, the path may be calculated using a path finding algorithm. For example a discrete optimal planning algorithm such as a forward or backward value iteration algorithm that iteratively computes a cost-to-go function over a state space. For example, at each step in the plan (e.g., each pay period) an investment (for investment goals) or savings amount may be maximized given the constraints to produce an optimal path comprising a plurality of steps.

At operation 150, using the path, the system may determine a map. For example, the user may select a theme and one or more maps corresponding to the theme. The map may include one or more steps and one or more milestones for one or more of the steps. The map may be created based upon a theme, each theme may specify various icons, backgrounds, and the like (e.g., a castle theme, a dragon theme, a science fiction theme, a game theme). The graphical depiction of the path may be created and superimposed on the theme background based upon a template (e.g., a generic predetermined path may be depicted on the map and the specific steps and milestones of the current path may be added). In other examples, a machine-learning algorithm may draw a map based upon the path on the theme. For example, a genetic algorithm may be trained based upon a knowledge base of human-created path depictions, and a feedback system of the appropriateness of each path depiction to the path created for each goal.

Figure 2:
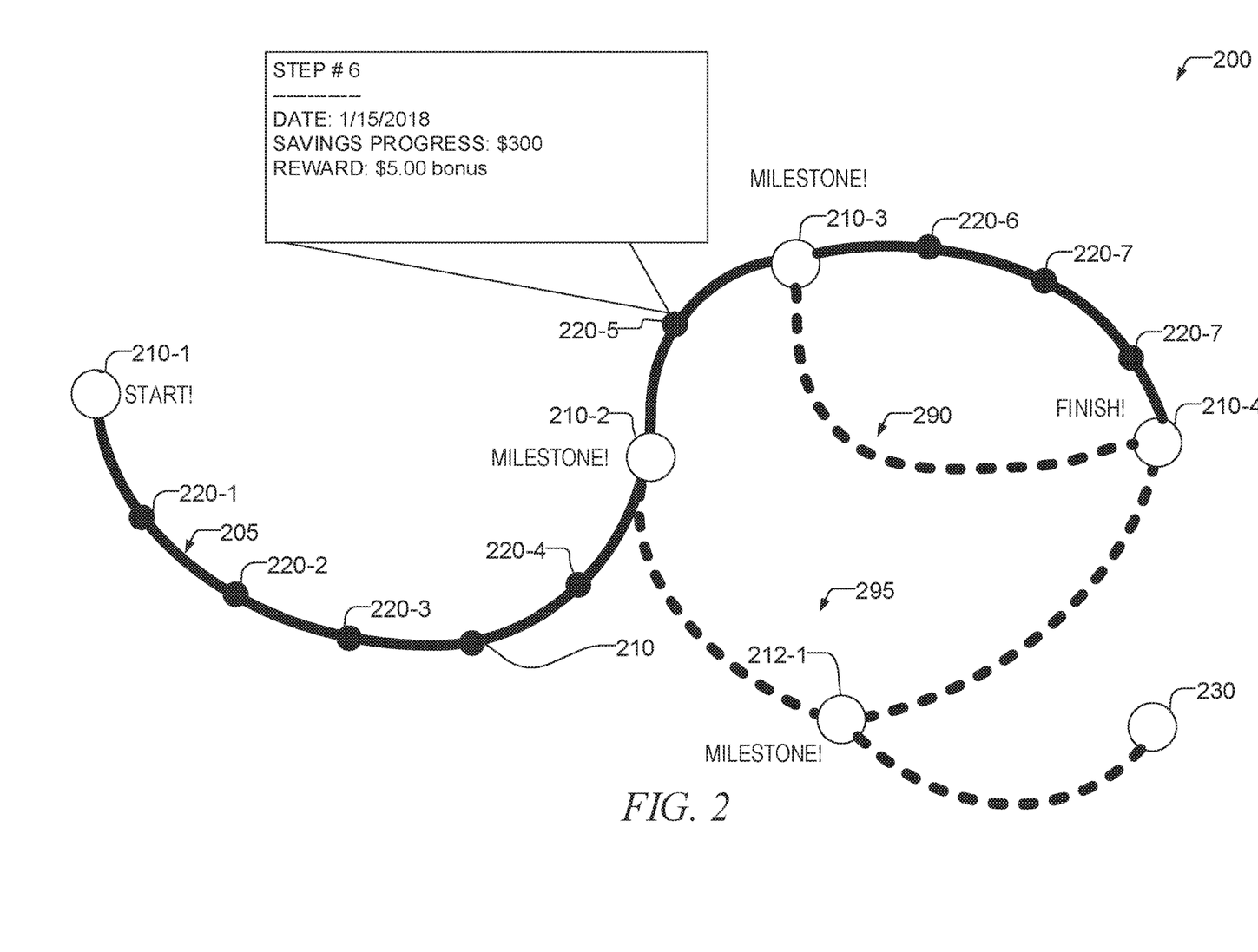
FIG. 2 illustrates a map of a journey between a start point and a goal point.

For example, FIG. 2 illustrates a map 200 of a journey between a start point 210-1 and a goal point 210-4. The map 200 may be generated as described above. Steps 220-1 to 220-7 are shown as dots. Milestones may be defined as every predetermined number of steps (e.g., every predetermined period of time), or may be specifically defined by the user. Milestones are shown by larger dots (e.g., such as at 210-1, 210-2, 210-3, and 210-4) and may be determined by the user (e.g., at operation 170) or by the GUI service (e.g., every predetermined number of steps may be a milestone).

The path is depicted as a main route between the start 210-1 and the goal 210-4 is shown by the solid dark line 205. If the user is below the goal level by the milestone at 210-2, the user may be directed down alternate path 295 with further milestone 212-1. For example, the alternate path 295 may represent a more aggressive savings amount (in the case of savings goals), the addition of additional tasks to achieve the goal (e.g., getting a job), and the like. Thus, for example, for the normal path, the user may be directed to save $10.00 every day to reach the goal, but in the more aggressive path, the user may be directed to save $15.00 every day to reach the goal. In some examples, if the user does not meet milestone 212-1, the user may not be able to make goal 201-4, but instead may be directed on a path to alternative goal 230. Similarly, if the user is not on target to meet the goal at milestone 201-3, they may be directed to second alternative path 290.

In some examples, the map may be interactive in that a graphical icon or avatar may represent the user's progress. The route shown on the map may also be customized and may change based upon the user's progress. For example, if the user is not meeting the progress expected, yet still hopes to achieve the user's goal by the deadline, the map may display the route on an incline (e.g., like a mountain) that gets progressively steeper as the user falls behind. In some examples, if the user is ahead of their goal, the incline goes downhill to represent that the user is ahead of their goal. As demonstrated in FIG. 2, the various steps and checkpoints may be clickable and may give information on the expected progress, the date of the checkpoint, and any rewards for meeting the expected progress.

Turning back to FIG. 1, at operation 170, the user may determine challenges, activities, and milestones. For example, the user may be rewarded at various points along the way with rewards if they are meeting the expected progress. In other examples, the user may specify activities such as games, puzzles, awards, and the like. At operation 180, the system may create one or more GUI descriptors including the map and the path. The GUI descriptor may be provided to a computing device of the user.

In some examples, the challenges, activities, and encouragements may be determined by the GUI service through selection by a machine learning model. The GUI service may train a model based upon user information (including goal information) and user outcomes along with indications of whether the challenges, activities, and encouragements were effective at motivation the user. For example, the training data may indicate that a particular encouragement or incentive was more or less effective at encouraging users in general, or specific types of users (determined by user demographic data in a user profile) to meet their goals. Example machine learning algorithms include regression algorithms, such as linear regression, decision forests, and the like.

In some examples, some parts, or all, of the process may be setup by a person different than the user trying to complete the goal. For example, a parent, guardian, third party, and the like may setup a map, complete with goals for a different user. Rewards may be rewards given by the GUI service, or by third parties. For example, a reward of a transfer of money from a grandparent to a grandchild user.

Figure 3:
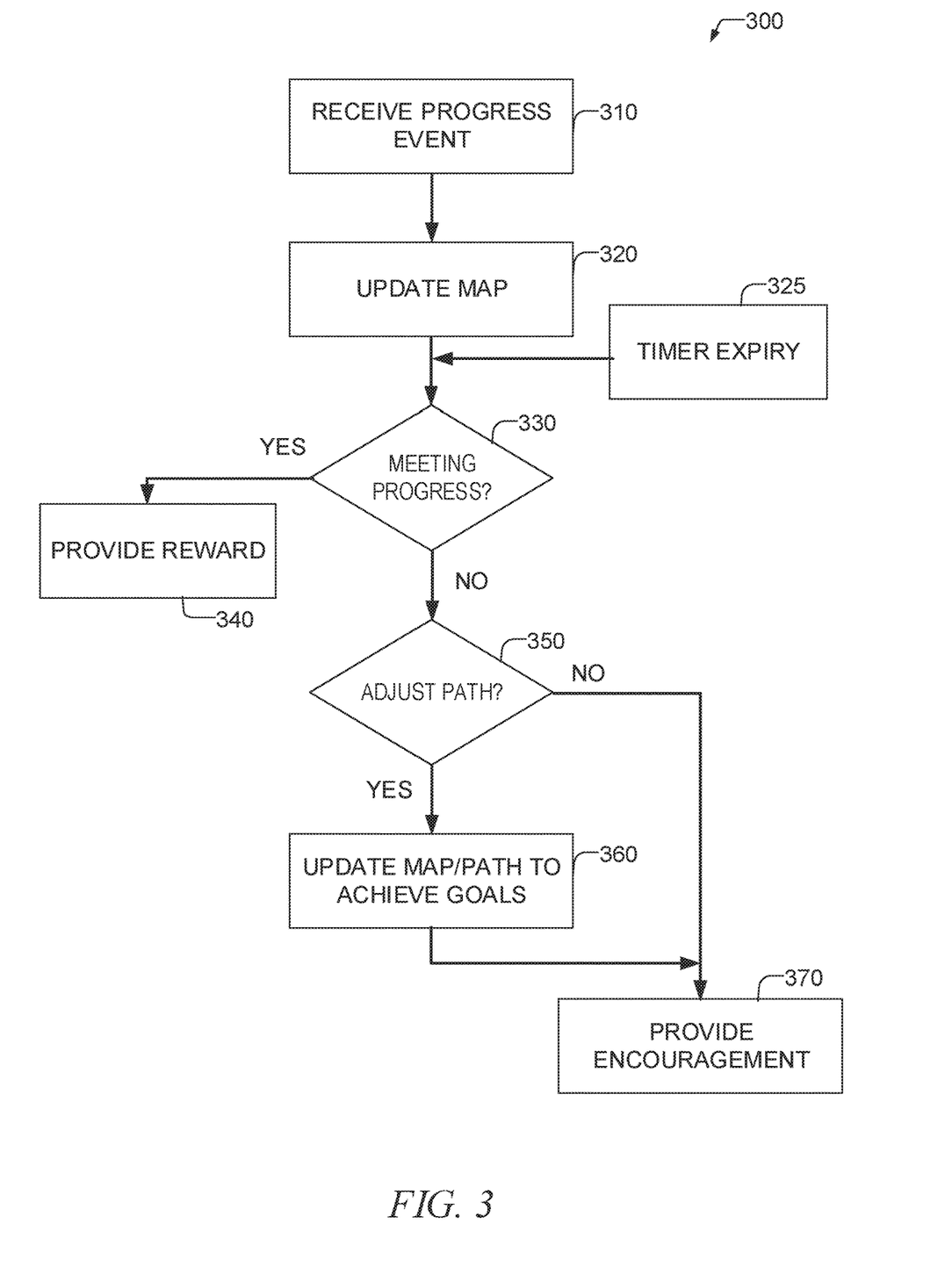
FIG. 3 illustrates a flowchart of a method of a GUI service monitoring progress and updating the map based upon the progress is shown according to some examples of the present disclosure.

Turning now to FIG. 3, a flowchart of a method 300 of a GUI service monitoring progress and updating the map based upon the progress is shown according to some examples of the present disclosure. At operation 310 a progress event is received. The progress event may be a notification of an event, or may be a request for information (such as an attribute of a profile of a member on the network service) by the goal tracking service to the network based service. Example events include account statuses—including balances, interest rates, and the like. Other events may include purchasing events (e.g., the user makes a purchase), savings events (the user deposits money into a savings or investment account), and the like. A progress event may be any event that relates to a goal, such as an event that indicates compliance with, or deviance from a goal set by the user. For financial goals, the progress event may be financial related events. For health and fitness goals, the progress events may be periods of physical activity or periods of sedentariness. The events may be reported by one or more external services, such as the network accessible service (e.g., the bank, social networking service, health monitoring service), user devices, user applications (e.g., mobile wallet applications), and the like.

At operation 320, the goal system may update the map in response to the progress event. Updates may include moving the avatar of the user as well as updates changing the depiction of the path and/or the map. For example, in response to events that indicate a user is falling behind a goal, a depicted incline of the path may increase (representing a harder "climb" to reach the goal). In response to events that indicate a user is ahead of their goal, a depicted incline may decrease (representing a downhill journey to the goal). As noted, an avatar or other representation of the user on their journey from start to the goal may be advanced in response to events indicating the user has made progress on the goal, or reversed if the event indicates that the user has taken steps to make the achievement of the goal more difficult. The amount that the avatar is advanced or reversed may depend on a magnitude associated with the event—e.g., for a savings goal, the user may be advanced an amount in relation to the amount deposited.

At operation 330, in some examples, the system may determine whether the user is on target to meet their goal. In some examples, in addition to performing the check of operation 330 after receiving a progress event, the goal system may check progress in predetermined time intervals. To accomplish this, in one example, the goal system may set a timer. The expiry of the timer at operation 325 triggers the progress check at operation 330. In some examples, upon triggering of the timer, the timer is reset (e.g., so it expires every predetermined amount of time).

If the user is on-target to meet the goal, the user may be rewarded at operation 340. For example, the system may send a reward to a user, or may set a flag that the next time a user logs into the goal system, the user is to receive the reward. At operation 350, if the user is not meeting progress a check is made to determine whether the path is to be adjusted. For example, a savings rate may need to be adjusted to achieve a savings goal by a particular time. At operation 360, if the path is to be adjusted, a new path and/or map may be created or updated. In addition to, or instead of updating the path, the depiction of the path on the map may be adjusted. For example, an incline of a path depiction may be raised or lowered. For example, the method of FIG. 1 may be repeated only using the current position as the start position and the goal position as the goal position. At operation 370 the system may provide encouragement to the user. For example, by providing a reward for additional effort, and the like. As noted earlier the encouragement may be selected by a user, or by a machine learned algorithm to maximize the motivation of the user to achieve their goal.

In some examples, the goals, path, steps, rewards, and other information may be stored in one or more data structures. For example, a path may be stored as a graph structure with steps as nodes connected by pathways as edges. Each node may store rewards, progress information, educational requirements, and the like.

Figure 4:
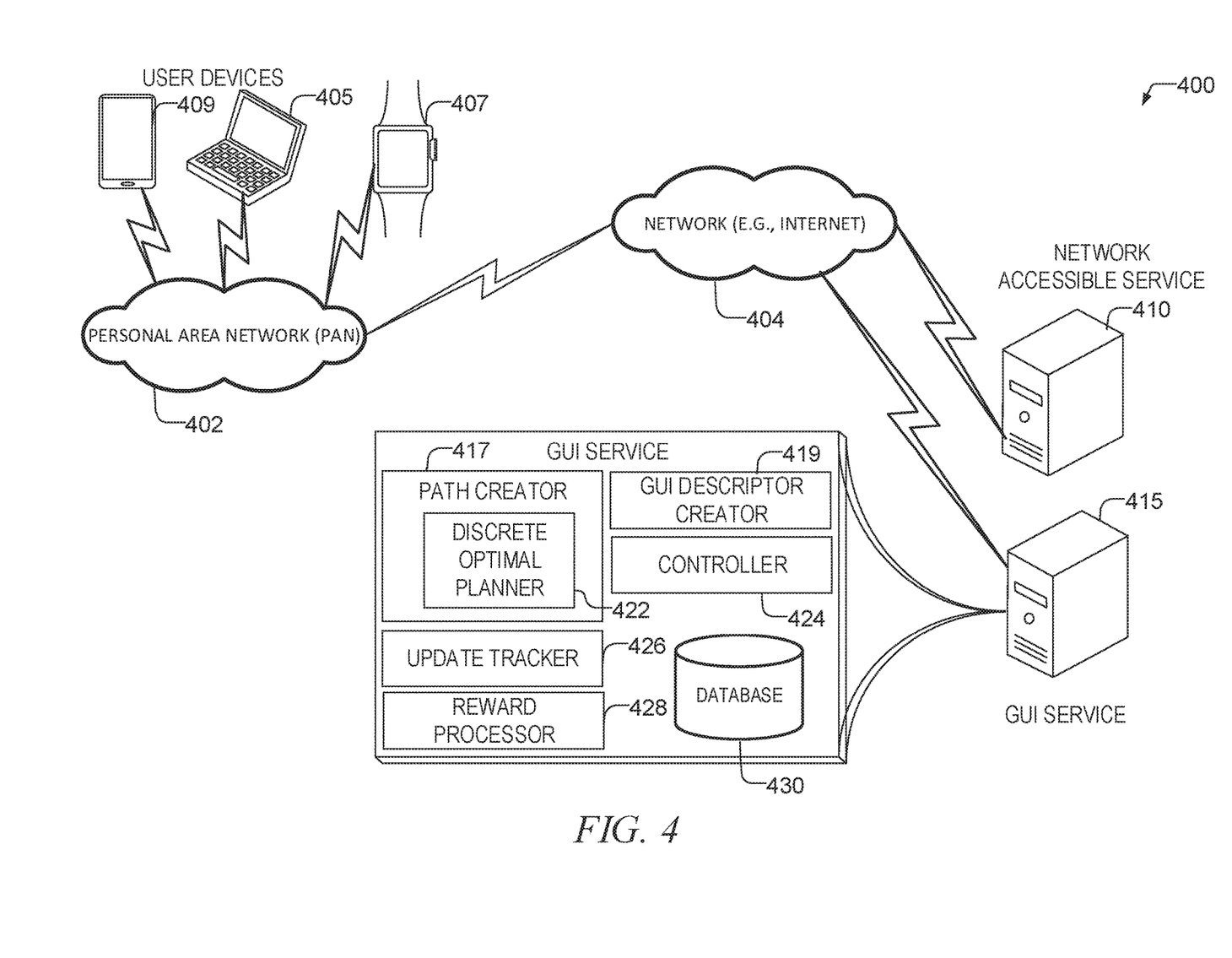
FIG. 4 shows a schematic of a system for providing a customized graphical user interface according to some examples of the present disclosure.

FIG. 4 shows a schematic of a system 400 for providing a customized graphical user interface according to some examples of the present disclosure. GUI service 415 may include a controller 424. Controller 424 may instruct GUI descriptor creator 419 to create and provide to users one or more GUI descriptors, that when rendered, allow the users to sign up for the GUI service 415, enter goals, enter constraints, choose themes, and the like. In some examples, the user may link an account on a different network-accessible service, such as network accessible service 410 (e.g., a financial institution, a health and fitness tracking service, a social networking service, and the like) to the account on the GUI service. Input from the GUI descriptors created by the GUI descriptor creator 419 may be received by the controller 424 and utilized by the controller 424 to create a profile on the GUI service for one or more users. The profile may be stored in database 430. A user may utilize one of the GUIs produced by a rendered GUI descriptor to setup a goal, enter information on current status, select themes, and the like. Controller 424 may pass this information to path creator 417 to create a path. Path creator 417 may include a discrete optimal planner 422 which may implement one or more discrete optimal planning algorithms, such as a value iteration algorithm. The path output by the path creator 417 may include a plurality of steps and expected progress at each step. This path may be passed by the controller 424 to the GUI descriptor creator 419 which may create a map with a visual representation of the path according to a theme selected by the user. The GUI descriptor creator 419 may utilize templates, or other algorithms, such as genetic algorithms to determine a visual representation of the path.

Update tracker 426 may receive or request from one or more sources progress events that update the GUI service 415 on the progress against their goal. Controller 424 may determine whether the user is on target, whether a visual representation that the user is behind (e.g., increasing an incline), or whether updates to the path are needed. For example, if the user is on target, no update (except updating the user's avatar along the path) may be necessary. If the user is behind a first predetermined amount the visual representation may be updated (e.g., increasing an incline of a path). In some examples, the plan may be modified such that the user may be prompted to take additional actions each step to meet the goal. For example, by putting more money into savings each step. If the user is behind goal a second predetermined amount (that may be greater than the first predetermined amount), the controller 424 may recalculate a path using path creator 417 by passing in the current progress, the goal time frame, and the goal. In some examples, if the user is behind goal by a third predetermined amount (greater than the second predetermined amount), the controller 424 may indicate to the user that the goal is not (or not likely) achievable and the user is prompted to adjust the goal or the timeframe.

Update tracker 426 may receive or contact one or more computing devices or services to obtain updates on the user's progress. For example, by contacting a network service to ascertain bank account or investment account information, health or fitness information, and the like.

Reward processor 428 may determine when one or more reward conditions have been met. The reward processor 428 may award the reward to the user by, for example, providing the reward through the GUI descriptor creator (e.g., in the case of visual rewards such as animations, games, avatars, emojis, and the like). In other examples, reward processor 428 may trigger a payment to the user by sending a payment message to a network accessible payment service (such as network accessible service 410). For example, a transfer from a grandparent's account to a grandchild's account. Database 430 may store user profile information including data structures representing goals, paths, themes, progress, rewards, and the like.

Users utilizing user computing devices such as a laptop 405, smart watch 407 (e.g., for fitness tracking), smartphone 409, and the like may access the GUI service 415 over network 404 (e.g., such as the internet). In some examples, the devices (e.g., such as the smart watch 407) may access the network 404 through a personal area network 402. For example, the smart watch 407 may connect to the network 404 through the laptop 405 or smartphone 409. In other examples, the smartphone 409, laptop 405, and smart watch 407 may connect to the network 404 directly. Network 404 may be a Local Area Network (LAN), Wide Area Network (WAN), Metropolitan Area Network (MAN), the Internet, and the like. User devices may download the GUI descriptors, render them to create one or more GUIs and provide input received to the GUI service 415.

Network accessible service 410 may be a network accessible service 410 that provides accounts to users and stores data about users. Examples include social networking services, health and fitness monitoring services, financial services (e.g., banking services, investment services, and the like). In some examples the functions provided by the GUI service 415 may be provided by the network accessible service 410.

Figure 5:
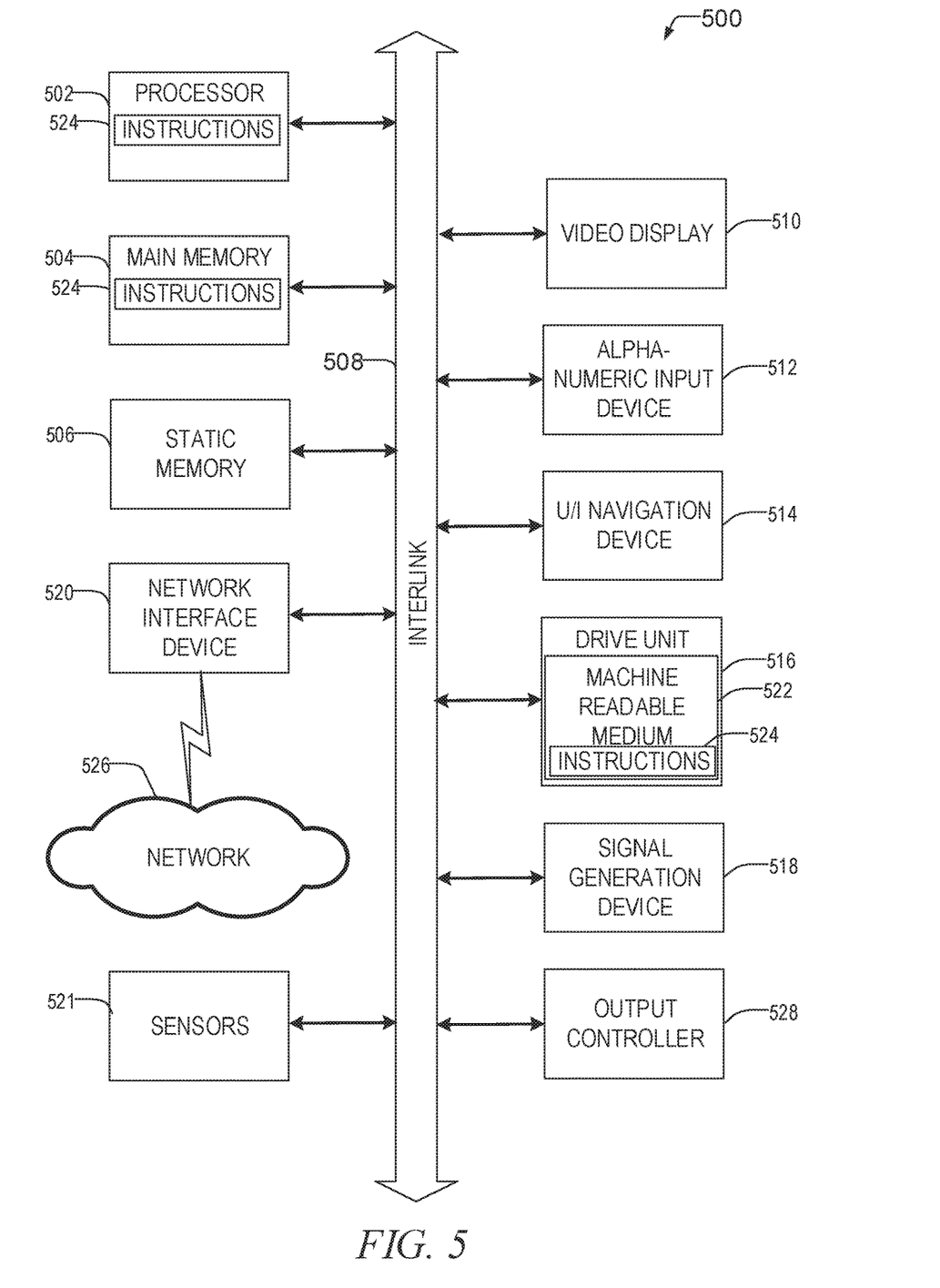
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user computing device, a GUI service, a network accessible service, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 500 may implement the methods of FIGS. 1 and 3, implement the GUI service and/or network accessible services of FIG. 4, produce GUI descriptors to produce the GUI of FIG. 2, and the like. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

OTHER NOTES AND EXAMPLES

Example 21 is a method for creating a user specific Graphical User Interface (GUI), the method comprising: receiving profile information of a network based service, the profile information describing an attribute of a user: receiving a selection of a goal from the user, the goal relating to the attribute; determining a start point of the user with respect to the goal, the start point of the user based upon the profile information; determining a path from the start point to the goal utilizing a planning algorithm, the path including a plurality of steps; generating a map based upon the path, the path visually represented on the map; and creating at least one GUI descriptor specifying instructions for rendering the user specific GUI, the GUI when rendered, displaying the map.

In Example 22, the subject matter of Example 21 includes, tracking progress of the user by representing the user as being at a point along the path on the map.

In Example 23, the subject matter of Example 22 includes, wherein tracking the progress of the user comprises periodically receiving updated profile information of the network based service.

In Example 24, the subject matter of Example 23 includes, determining that based upon the progress of the user, that the goal is not possible within a time constraint set by the user, and in response, adjusting one of: the goal or the time constraint.

In Example 25, the subject matter of Examples 23-24 includes, determining that based upon the progress of the user, that the user has earned a reward; and providing the reward to the user.

In Example 26, the subject matter of Examples 23-25 includes, wherein tracking the progress of the user comprises receiving data about the user's adherence to the path from a plurality of distributed data sources.

In Example 27, the subject matter of Examples 21-26 includes, wherein the planning algorithm comprises a discrete optimal planning algorithm.

In Example 28, the subject matter of Example 27 includes, wherein the discrete optimal planning algorithm comprises a value iteration algorithm.

Example 29 is a computing device for creating a user specific Graphical User Interface (GUI), the computing device comprising: a hardware processor; a memory, storing instructions, which when executed, cause the hardware processor to perform operations comprising: receiving profile information of a network based service, the profile information describing an attribute of a user; receiving a selection of a goal from the user, the goal relating to the attribute; determining a start point of the user with respect to the goal, the start point of the user based upon the profile information; determining a path from the start point to the goal utilizing a planning algorithm, the path including a plurality of steps: generating a map based upon the path, the path visually represented on the map; and creating at least one GUI descriptor specifying instructions for rendering the user specific GUI, the GUI when rendered, displaying the map.

In Example 30, the subject matter of Example 29 includes, wherein the operations further comprise: tracking progress of the user by representing the user as being at a point along the path on the map.

In Example 31, the subject matter of Example 30 includes, wherein tracking the progress of the user comprises periodically receiving updated profile information of the network based service.

In Example 32, the subject matter of Example 31 includes, wherein the operations further comprise: determining that based upon the progress of the user, that the goal is not possible within a time constraint set by the user, and in response, adjusting one of: the goal or the time constraint.

In Example 33, the subject matter of Examples 31-32 includes, wherein the operations further comprise: determining that based upon the progress of the user, that the user has earned a reward; and providing the reward to the user.

In Example 34, the subject matter of Examples 31-33 includes, wherein the operations of tracking the progress of the user comprises receiving data about the user's adherence to the path from a plurality of distributed data sources.

In Example 35, the subject matter of Examples 29-34 includes, wherein the planning algorithm comprises a discrete optimal planning algorithm.

In Example 36, the subject matter of Example 35 includes, wherein the discrete optimal planning algorithm comprises a value iteration algorithm.

Example 37 is a machine-readable medium for creating a user specific Graphical User Interface (GUI), the machine-readable medium storing instructions, which when executed by a machine, cause the machine to perform operations comprising: receiving profile information of a network based service, the profile information describing an attribute of a user; receiving a selection of a goal from the user, the goal relating to the attribute; determining a start point of the user with respect to the goal, the start point of the user based upon the profile information; determining a path from the start point to the goal utilizing a planning algorithm, the path including a plurality of steps; generating a map based upon the path, the path visually represented on the map; and creating at least one GUI descriptor specifying instructions for rendering the user specific GUI, the GUI when rendered, displaying the map.

In Example 38, the subject matter of Example 37 includes, wherein the operations further comprise: tracking progress of the user by representing the user as being at a point along the path on the map.

In Example 39, the subject matter of Example 38 includes, wherein tracking the progress of the user comprises periodically receiving updated profile information of the network based service.

In Example 40, the subject matter of Example 39 includes, wherein the operations further comprise: determining that based upon the progress of the user, that the goal is not possible within a time constraint set by the user, and in response, adjusting one of: the goal or the time constraint.

In Example 41, the subject matter of Examples 39-40 includes, wherein the operations further comprise: determining that based upon the progress of the user, that the user has earned a reward; and providing the reward to the user.

In Example 42, the subject matter of Examples 39-41 includes, wherein the operations of tracking the progress of the user comprises receiving data about the user's adherence to the path from a plurality of distributed data sources.

In Example 43, the subject matter of Examples 37-42 includes, wherein the planning algorithm comprises a discrete optimal planning algorithm.

In Example 44, the subject matter of Example 43 includes, wherein the discrete optimal planning algorithm comprises a value iteration algorithm.

Example 45 is a device for creating a user specific Graphical User Interface (GUI), the device comprising: means for receiving profile information of a network based service, the profile information describing an attribute of a user; means for receiving a selection of a goal from the user, the goal relating to the attribute; means for determining a start point of the user with respect to the goal, the start point of the user based upon the profile information; means for determining a path from the start point to the goal utilizing a planning algorithm, the path including a plurality of steps; means for generating a map based upon the path, the path visually represented on the map; and means for creating at least one GUI descriptor specifying instructions for rendering the user specific GUI, the GUI when rendered, displaying the map.

In Example 46, the subject matter of Example 45 includes, means for tracking progress of the user by representing the user as being at a point along the path on the map.

In Example 47, the subject matter of Example 46 includes, wherein the means for tracking the progress of the user comprises means for periodically receiving updated profile information of the network based service.

In Example 48, the subject matter of Example 47 includes, means for determining that based upon the progress of the user, that the goal is not possible within a time constraint set by the user, and in response, adjusting one of: the goal or the time constraint.

In Example 49, the subject matter of Examples 47-48 includes, means for determining that based upon the progress of the user, that the user has earned a reward; and means for providing the reward to the user.

In Example 50, the subject matter of Examples 47-49 includes, wherein the means for tracking the progress of the user comprises means for receiving data about the user's adherence to the path from a plurality of distributed data sources.

In Example 51, the subject matter of Examples 45-50 includes, wherein the planning algorithm comprises a discrete optimal planning algorithm.

In Example 52, the subject matter of Example 51 includes, wherein the discrete optimal planning algorithm comprises a value iteration algorithm.

Example 53 is at least one machine-readable medium including instructions that, when executed by processing circuitry, cause the processing circuitry to perform operations to implement of any of Examples 21-52.

Example 54 is an apparatus comprising means to implement of any of Examples 21-52.

Example 55 is a system to implement of any of Examples 21-52.

Example 56 is a method to implement of any of Examples 21-52.

What is claimed is:

1. A method comprising:
receiving profile information of a user from a network-based service, the profile information describing an attribute of the user;
receiving a selection of a goal from the user, the goal relating to the attribute;
determining a start point of the user with respect to the goal, the start point of the user being based on the profile information;
determining a path from the start point to the goal;
generating and displaying a map on which the path is visually represented;
tracking progress of the user, the tracking of the progress of the user comprising representing the user as being at a point on the path; and
changing a graphical depiction of a displayed incline of the path based on whether or not the tracking of the progress of the user indicates that the user is on track to achieve the goal.

2. The method of claim 1, wherein tracking the progress of the user comprises periodically receiving updated profile information from the network-based service.

3. The method of claim 1, wherein tracking the progress of the user comprises receiving data about the user's adherence to the path from a plurality of data sources.

4. The method of claim 1, wherein determining the path comprises using a planning algorithm to determine the path.

5. The method of claim 4, wherein the planning algorithm comprises a discrete optimal planning algorithm.

6. The method of claim 5, wherein the discrete optimal planning algorithm comprises a value-iteration algorithm.

7. The method of claim 1, wherein:
the path includes a plurality of steps;
the plurality of steps comprises one or more milestones; and
changing the graphical depiction of the displayed incline of the path based on whether or not the tracking of the progress of the user indicates that the user is on track to achieve the goal comprises changing the graphical depiction of the displayed incline of the path based on determining that, as of a milestone in the one or more milestones, the user is not on track to reach the goal within a time constraint.

8. The method of claim 7, wherein the time constraint is set by the user.

9. The method of claim 1, further comprising:
determining, based upon the progress of the user, that the user has earned a reward; and
providing the reward to the user.

10. A system comprising:

at least one processor; and one or more non-transitory computer readable storage media containing instructions executable by the at least one processor for causing the at least one processor to perform operations comprising:

receiving profile information of a user from a network-based service, the profile information describing an attribute of the user;

receiving a selection of a goal from the user, the goal relating to the attribute;

determining a start point of the user with respect to the goal, the start point of the user being based on the profile information;

determining a path from the start point to the goal;

generating and displaying a map on which the path is visually represented;

tracking progress of the user, the tracking of the progress of the user comprising representing the user as being at a point on the path; and changing a graphical depiction of a displayed incline of the path based on whether or not the tracking of the progress of the user indicates that the user is on track to achieve the goal.

11. The system of claim 10, wherein tracking the progress of the user comprises periodically receiving updated profile information from the network-based service.

12. The system of claim 10, wherein tracking the progress of the user comprises receiving data about the user's adherence to the path from a plurality of data sources.

13. The system of claim 10, wherein determining the path comprises using a planning algorithm to determine the path.

14. The system of claim 13, wherein the planning algorithm comprises a discrete optimal planning algorithm.

15. The system of claim 14, wherein the discrete optimal planning algorithm comprises a value-iteration algorithm.

16. The system of claim 10, wherein:

the path includes a plurality of steps;

the plurality of steps comprises one or more milestones; and changing the graphical depiction of the displayed incline of the path based on whether or not the tracking of the progress of the user indicates that the user is on track to achieve the goal comprises changing the graphical depiction of the displayed incline of the path based on determining that, as of a milestone in the one or more milestones, the user is not on track to reach the goal within a time constraint.

17. The system of claim 16, wherein the time constraint is set by the user.

18. The system of claim 10, further comprising:

determining, based upon the progress of the user, that the user has earned a reward; and providing the reward to the user.

19. One or more non-transitory computer readable storage media containing instructions executable by at least one processor for causing the at least one processor to perform operations comprising:

receiving profile information of a user from a network-based service, the profile information describing an attribute of the user;

receiving a selection of a goal from the user, the goal relating to the attribute;

determining a start point of the user with respect to the goal, the start point of the user being based on the profile information;

determining a path from the start point to the goal;

generating and displaying a map on which the path is visually represented;

tracking progress of the user, the tracking of the progress of the user comprising representing the user as being at a point on the path; and changing a graphical depiction of a displayed incline of the path based on whether or not the tracking of the progress of the user indicates that the user is on track to achieve the goal.

20. The one or more non-transitory computer readable storage media of claim 19, wherein:

the path includes a plurality of steps;

the plurality of steps comprises one or more milestones; and changing the graphical depiction of the displayed incline of the path based on whether or not the tracking of the progress of the user indicates that the user is on track to achieve the goal comprises changing the graphical depiction of the displayed incline of the path based on determining that, as of a milestone in the one or more milestones, the user is not on track to reach the goal within a time constraint.

* * * * *